United States Patent [19]

Lucas

[11] Patent Number: 4,506,384
[45] Date of Patent: Mar. 19, 1985

[54] SYNCHRONIZED, MULTITRANSMITTER, SINGLE FREQUENCY PAGING SYSTEM

[75] Inventor: Alfred R. Lucas, Coral Springs, Fla.

[73] Assignee: Motorola, Inc., Schaumburg, Ill.

[21] Appl. No.: 450,871

[22] Filed: Dec. 20, 1982

[51] Int. Cl.³ ............................................. H04B 7/26
[52] U.S. Cl. ................................ 455/51; 340/825.21; 340/825.5; 455/54; 455/57; 455/58
[58] Field of Search ........................ 455/53, 54, 56–58, 455/51, 88; 179/2 EC; 340/825.21, 825.5

[56] References Cited

U.S. PATENT DOCUMENTS

| 2,509,237 | 5/1950 | Labin et al. | 455/57 |
| 3,743,937 | 7/1973 | Saillard | 455/53 |
| 4,056,780 | 11/1977 | Faulkner | 455/58 |
| 4,160,240 | 7/1979 | Partipilo | |

OTHER PUBLICATIONS

"Radio Aids Stanford Medical Center" Communications, Feb. 1979 (pp. 60–61).

Primary Examiner—Marc E. Bookbinder
Attorney, Agent, or Firm—Donald B. Southard; James W. Gillman; Edward M. Roney

[57] ABSTRACT

The invention is a synchronized communication system for effectively transmitting messages to a remote mobile receiver where the system includes a plurality of transmitters operating on a single RF communication channel. The system includes a central wide area transmitter which transmits messages over a wide area. The system also includes a plurality of local transmitters which transmit messages over a local area within the wide area served by the wide area transmitter. The transmitters of the system are coordinated by a synchronization link which allows the central wide area transmitter to be keyed only when the local transmitters are not keyed. Correspondingly the synchronization link only allows the local transmitters to be keyed when the central wide area transmitter is not keyed. Normally the synchronization link keys and dekeys the central wide area transmitter and local transmitters in a normal timing cell pattern. If the central wide area transmitter builds up a backlog of messages, the synchronization link may interrupt the normal timing cell and reduce the backlog by holding the central wide area transmitter keyed for an extended period of time.

11 Claims, 3 Drawing Figures

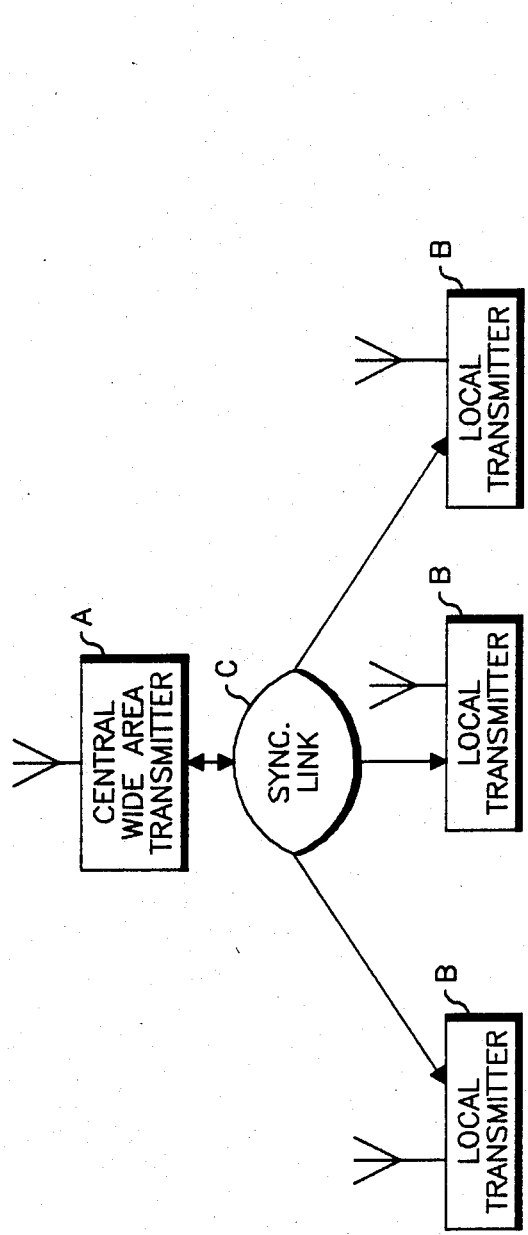
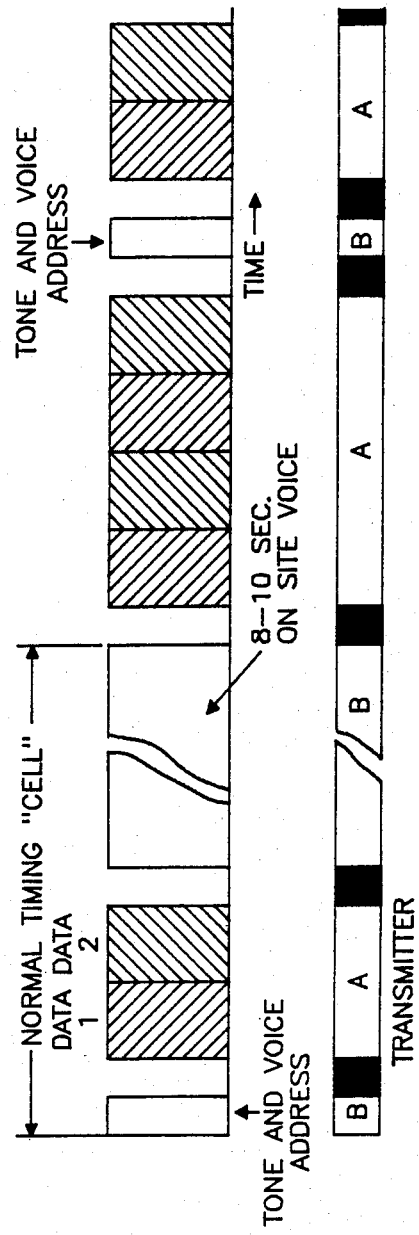
Fig. 1
Fig. 2a
Fig. 2b

SYNCHRONIZED, MULTITRANSMITTER, SINGLE FREQUENCY PAGING SYSTEM

BACKGROUND OF THE INVENTION

The invention is directed to an improved paging system. In particular the invention is directed to a combination of a wide area paging system with a plurality of localized paging systems in a master-slave relationship. The localized paging systems are operated simultaneously in coordination with the wide area paging system. Both the wide area and the localized paging systems operate at the same RF frequency.

Hospital communication networks have traditionally been plagued by a lack of RF spectrum. In some systems an individual is sometimes required to carry two or more pagers. One pager is connected into a local system (i.e. a hospital) while the second pager is connected into a second system which probably is a wide area system to cover the individual in his/her car or home. The wide area system alone is insufficient in a hospital environment where RF interference and other undesirable characteristics, such as thick walls, cause the wide area system to sometimes be too weak to reach the pager when the pager user is inside the hospital. Therefore, today one RF channel is utilized for the wide area system while a second RF channel is utilized for each of the local RF channel systems.

It is the object of this invention to better utilize the RF channels available in a given area by creating a master-slave relationship between the wide area and local area paging systems so only a single RF channel is needed. The wide area system transmits tone only and data pages during time periods wasted in many of today's systems.

A further object of the invention is to replace a plurality of pagers with a single pager operating on a single frequency and capable of interfacing with both the local system and the wide area system.

SUMMARY OF THE INVENTION

The invention is a synchronized communication system for effectively transmitting messages to a remote mobile receiver where the system includes a plurality of transmitters operating on a single RF communication channel. The system includes a central wide area transmitter which transmits messages over a wide area. The system also includes a plurality of local transmitters which transmit messages over a local area within the wide area served by the wide area transmitter. The transmitters of the system are coordinated by a synchronization link which allows the central wide area transmitter to be keyed only when the local transmitters are not keyed. Correspondingly the synchronization link only allows the local transmitters to be keyed when the central wide area transmitter is not keyed. Normally the synchronization link keys and dekeys the central wide area transmitter and local transmitters in a normal timing cell pattern. If the central wide area transmitter builds up a backlog of messages, the synchronization link may interrupt the normal timing cell and reduce the backlog by holding the central wide area transmitter keyed for an extended period of time.

BRIEF DESCRIPTION OF THE DRAWINGS

FIG. 1 is a block diagram of the communications system according to the invention.

FIG. 2a shows the synchronization pattern for the messages transmitted by the central wide area transmitter and the plurality of local transmitters in the communications system according to the invention.

FIG. 2b shows the keying and dekeying sequence for the central wide area transmitter and the plurality of local transmitters in the communications system according to the invention.

DETAILED DESCRIPTION OF THE DRAWINGS

FIG. 1 shows a block diagram of the communications system according to the invention. A central wide area transmitter A services a large area which encompasses the service areas of the plurality of localized transmitters B. A synchronization link C coordinates the activity of the central wide area transmitter A and the plurality of localized transmitters B. While the central wide area transmitter A services all the area included by the localized transmitters B, there is potentially a problem for the central wide area transmitter A when a pager user enters a building such as a hospital. In addition to the usual problems a building causes for a RF transmission, a hospital represents a special problem because of the high degree of RF interference cause by the concentration of electronic equipment. In the past, one remedy to this actual or potential problem was to have two different communications systems. Each of the two systems would have its own RF channel. Therefore a doctor or nurse could rely on the RF link of the central wide area transmitter A when they were not in the hospital. Within the hospital, the doctor or nurse could rely on the second RF link provided by the localized transmitter B. The localized transmitter B would commonly be located at the hospital site. The result is that the doctor or nurse using the system is required to carry two different pagers. In addition, the system utilizes two RF channels in a manner that is not highly efficient. This is a considerable problem in urban areas where the RF spectrum is very crowded. Another remedy sometimes employed is to re-radiate at the local site the RF transmission from the central wide area transmitter.

The invention as shown in FIG. 1 solves these problems by creating a synchronized system which utilizes only one RF channel. Since the central wide area transmitter A services an area that overlaps each of the localized transmitters B, the synchronization link C dekeys the localized transmitters B when the central wide area transmitter A is keyed. Since none of the localized transmitters B overlap one another, they all can be keyed simultaneously. But each local system should work on a FM capture effect in order to compensate for the presence of a possible weak signal from a neighboring local system. The synchronization link C keys the localized transmitters simultaneously and dekeys the central wide area transmitter. By synchronizing the localized transmitters B and the central wide area transmitter A there need be only one RF channel used and the doctor or nurse need only carry one pager.

The synchronization link C is preferably located at the site of the central wide area transmitter A. The central wide area transmitter A is the master in a master-slave relationship with the localized transmitters B. The synchronization link C allows the central wide area transmitter A to override the usual synchronization pattern established by the synchronization link C when the central wide area transmitter A collects a backlog of messages to be transmitted. This will be explained more fully in connection with FIGS. 2a and 2b. The synchronization link can be a commercially available base station control center modified to key and dekey according to the synchronization pattern of FIGS. 2a and 2b. For example, a base station sold by Motorola Inc. under the product name of PURC Radio Link Transmitters/Repeaters may be employed for the synchronization link C. Such modification can easily be implemented without undue experimentation by one of ordinary skill in the art.

FIGS. 2a and 2b show the synchronization pattern of the central wide area transmitter A and the localized transmitters B. In FIG. 2a a normal time cell is shown. When the central wide area transmitter A is not backlogged, the synchronization link C will key and dekey the transmitters according to the message sequence shown within the normal timing cell sequence in FIG. 2a. FIG. 2b shows which transmitter is keyed during the normal timing cell. The localized transmitters B are first keyed so they can transmit a tone and voice address to a pager located in the covered area, (i.e. a hospital). All of the localized transmitters B are keyed simultaneously by the synchronization link C. Accordingly, they are all dekeyed simultaneously at the end of the tone and voice address. Each localized transmitter B can transmit a unique tone and voice address since each localized transmitter B is under message control by a local terminal in a manner well known to those of ordinary skill in the art.

After the tone and voice address messages are sent by the localized transmitters B, the particular pagers which have been addressed will respond by activating an audio tone which alerts the user to the soon to be transmitted voice message. Since this audio tone requires a finite time which is quite lengthy in comparison to the rate of data or tone transmission, there is a period of "dead air" time in which the localized transmitters B are not transmitting since they are waiting for the particular pagers which have been addressed to finish their audio tone response. This "dead time" exists in certain desirable coding schemes for pagers. Five or six tone or binary coding schemes are examples of coding schemes with useable "dead time". In the synchronization system according to the invention this "dead time" is used by the central wide area transmitter A to transmit data or tone address messages. To implement this, the synchronization link C dekeys all the localized transmitters B and keys the central wide area transmitter A for the time during which the particular pagers addressed by the localized transmitters B are responding with an audio tone to alert the user of a forthcoming voice message. At the end of the data or tone address message the synchronization link C dekeys the central wide area transmitter A and rekeys the localized transmitters B to complete their message by transmitting the voice message to the previously addressed pager. To the pager user, the period of time the localized transmitter was dekeyed is not noticed since the pager occupies the time period by sounding an alert tone to the user.

If the central wide area transmitter A has more data or tone messages than can be transmitted in the time window allowed by the audio tone of the localized pager, the synchronization link C can hold the central wide area transmitter A in a keyed condition until some portion of the messages are transmitted. This causes the system to leave its normal timing cell. This is depicted in the latter portion of the time sequence shown in FIGS. 2a and 2b. The synchronization link C polls the central wide area transmitter A base station site to determine if a backlog of messages awaiting transmission are present. If there is such a backlog, the synchronization link will hold the central wide area transmitter A keyed for a period of time longer than in the normal timing cell. The synchronization link C will hold the localized transmitters B in a dekeyed condition. What portion of the backlog is transmitted during a single interruption of the normal timing cell is determined by the system user. The system can be prioritized at the synchronization link C so that the central wide area transmitter A can only interrupt a normal timing cell for something less than a predetermined time period. In this manner, emergency calls in the local transmitters will not be delayed because of a long backlog at the wide area transmitter A. When the backlog is transmitted or the predetermined maximum interrupt time has elapsed the synchronization link C will dekey the central wide area transmitter A and key the localized transmitter B and thereby begin a new normal timing cell.

As an alternate embodiment, the localized transmitters B may be the masters in the master-slave relationship between the central wide area transmitter A and the localized transmitters B. The synchronization link will assign the busiest local transmitter as the master in the system master-slave relationship. In this embodiment, the central wide area transmitter A will have a message "dead time" in which it would be dekeyed and the localized transmitters keyed to transmit messages during this message "dead time". If the localized transmitters B build up a backlog of messages, the synchronization link C will extend the period of time the localized transmitters are keyed.

What is claimed is:

1. A synchronized communication system for effectively transmitting messages to a plurality of remote mobile receivers wherein said system operates on a single RF communication channel, said system comprising,
   a central wide area transmitter which transmits messages to the plurality of mobile receivers,
   a plurality of localized transmitters within the wide area which transmits messages to the plurality of mobile receivers,
   a synchronization link between said central wide area transmitter and said plurality of localized transmitters to create a master-slave relationship wherein said plurality of localized tramsmitters is keyed simultaneously and only when said central wide area transmitter is not keyed.

2. A synchronized communication system according to claim 1 wherein said synchronization link creates a master-slave relationship wherein said plurality of localized transmitters is dekeyed whenever said central wide area transmitter is keyed.

3. A synchronized communication system according to claim 1 wherein the plurality of mobile receivers has a time window associated with its response to a message transmission from said plurality of localized transmitters wherein during said time window said synchronization link dekeys said plurality of localized transmitters and keys said central wide area transmitter.

4. A synchronized communication system according to claim 1 wherein said synchronization link normally follows a keying and dekeying sequence of keying said plurality of localized transmitters to transmit a tone and voice address, dekeying said plurality of localized transmitters, keying said central wide area transmitter to transmit at least one set of data or tones, dekeying, said central wide area transmitter, keying said plurality of localized transmitter to transmit a voice message.

5. A synchronized communication system according to claim 4 wherein said synchronization link will interrupt said normal sequence to cause said central wide area transmitter to remain keyed in order to transmit a plurality of messages in response to an indication from said central wide area transmitter that a backlog of data or tones are awaiting transmission.

6. A synchronized communication system according to claim 1 wherein said synchronization link normally follows a keying and dekeying sequence of keying said central wide area transmitter to transmit a tone and voice address, dekeying said central wide area transmitter, keying said plurality of localized transmitters to transmit at least one set of data or tones, dekeying said plurality of localized transmitters, keying said central wide area transmitter to transmit a voice message.

7. A synchronized communication system according to claim 6 wherein said synchronization link will interrupt said normal sequence to cause said plurality of localized transmitters to remain keyed in order to transmit a plurality of messages in response to an indication from said localized transmitter that a backlog of data or tones are awaiting transmission.

8. A method of effectively transmitting messages on a single channel in a synchronized communication system including a plurality of remote mobile receivers, a central wide area transmitter and a plurality of localized transmitters within the wide area, the method comprising the sequential steps of;
  (a) simultaneously keying said localized transmitters and transmitting a local address to the mobile receiver,
  (b) dekeying said localized transmitters,
  (c) keying said central wide area transmitter for a predetermined time period and transmitting a wide area address and message to the mobile receivers,
  (d) dekeying said central wide area transmitter,
  (e) keying said localized transmitters and transmitting a message to the mobile receivers addressed in step a.

9. A method according to claim 8 wherein the central wide area transmitter remains in a keyed position for a time period greater than said predetermined time period if a backlog of wide area messages are awaiting transmission.

10. A method of effectively transmitting messages on a single channel in a synchronized communication system including a plurality of remote mobile receivers, a central wide area transmitter and a plurality of localized transmitters within the wide area, said method comprising the sequential steps of:
  (a) keying said central wide area transmitter and transmitting an address to the mobile receivers,
  (b) dekeying said central wide area transmitter,
  (c) simultaneously keying said localized transmitters for a predetermined time period and transmitting a local address and message to the mobile receivers,
  (d) simultaneously dekeying said localized transmitters,
  (e) keying said central wide area transmitter and transmitting a message to the mobile receivers addressed in step a.

11. A method according to claim 10 wherein the localized transmitters remain in a keyed position for a time period greater than said predetermined time period if a backlog of local messages are awaiting transmission.

* * * * *